(12) United States Patent
Christoforou et al.

(10) Patent No.: US 8,505,426 B2
(45) Date of Patent: Aug. 13, 2013

(54) MULTIPLE ACTUATING-FORCE SHEARING MACHINE

(75) Inventors: Peter Christoforou, Derbyshire (GB); Michael Trevor Clark, Sheffield (GB); David Eastwood, Chesterfield (GB); David Stonecliffe, Sheffield (GB); Shaun Tyas, Barnsley (GB)

(73) Assignee: Siemens Vai Metals Technologies Ltd. (GB)

( * ) Notice: Subject to any disclaimer, the term of this patent is extended or adjusted under 35 U.S.C. 154(b) by 516 days.

(21) Appl. No.: 12/676,941

(22) PCT Filed: Sep. 1, 2008

(86) PCT No.: PCT/EP2008/007124
§ 371 (c)(1),
(2), (4) Date: Apr. 28, 2010

(87) PCT Pub. No.: WO2009/030445
PCT Pub. Date: Mar. 12, 2009

(65) Prior Publication Data
US 2010/0229705 A1    Sep. 16, 2010

(30) Foreign Application Priority Data
Sep. 7, 2007  (EP) ..................................... 07253538

(51) Int. Cl.
*B26D 5/12*    (2006.01)
(52) U.S. Cl.
USPC ............................... 83/617; 83/636; 83/639.5
(58) Field of Classification Search
USPC ............. 83/617, 624, 625, 636, 639.1, 639.2, 83/639.3, 639.5, 694; 100/269.01–269.21
See application file for complete search history.

(56) References Cited

U.S. PATENT DOCUMENTS

| | | | | |
|---|---|---|---|---|
| 1,334,718 A | * | 3/1920 | Slick | 83/624 |
| 2,541,110 A | * | 2/1951 | Sigoda | 83/583 |

(Continued)

FOREIGN PATENT DOCUMENTS

| | | |
|---|---|---|
| FR | 2 212 771 A | 7/1974 |
| GB | 2 405 118 A | 2/2005 |

(Continued)

OTHER PUBLICATIONS

International Search Report dated Nov. 19, 2008, issued in corresponding international application No. PCT/EP2008/007124.

(Continued)

*Primary Examiner* — Stephen Choi
(74) *Attorney, Agent, or Firm* — Ostrolenk Faber LLP

(57) ABSTRACT

A method, and an apparatus, for operating a hydraulic shearing machine. For cutting a shearing-movement of at least one shear blade which is curved, starting from a starting-position under application of an overall actuating-force and for resetting of the shear blades which were moved for cutting to their starting-position after accomplishment of the shearing-movement, a reset-movement under application of an overall reset-force. The shearing-movement and the reset-movement are accomplished by a hydraulic actuating-mechanism comprising hydraulic cylinders, wherein the overall actuating-force and the overall reset-force being applied to the moved shear blades by at least one hydraulic cylinder of the actuating-mechanism. The magnitude of the overall actuating-force is adjustable by switching one or several hydraulic cylinders of the actuating-mechanism in and out of operation-mode. The method proposes that the positions of the curved shear blade are controlled by a control system by regulating the flow of hydraulic fluid to the hydraulic cylinders according to setpoints for a shear blade position versus time function and the overall actuating-force and overall reset-force requirements.

15 Claims, 4 Drawing Sheets

(56) References Cited

U.S. PATENT DOCUMENTS

| | | | | |
|---|---|---|---|---|
| 3,081,659 | A | * | 3/1963 | Theobald .......................... 83/554 |
| 3,316,791 | A | * | 5/1967 | Hamacher et al. ............... 83/566 |
| 3,530,761 | A | * | 9/1970 | Erwin .............................. 83/644 |
| 4,249,443 | A | * | 2/1981 | Jagers ............................. 83/490 |
| 4,250,782 | A | * | 2/1981 | Munker .......................... 83/376 |
| 4,409,792 | A | * | 10/1983 | Nowak ............................ 60/414 |
| 4,443,143 | A | * | 4/1984 | Asari et al. .................... 409/295 |
| 4,459,889 | A | * | 7/1984 | Holton et al. ................... 83/597 |
| 4,646,599 | A | * | 3/1987 | Benedict ......................... 83/131 |
| 2006/0104786 | A1 | * | 5/2006 | Shepherd et al. ............. 414/699 |

FOREIGN PATENT DOCUMENTS

| | | |
|---|---|---|
| JP | 61-173808 | 8/1986 |
| JP | H 3-36712 | 4/1991 |

OTHER PUBLICATIONS

Japanese Office Action, dated Mar. 19, 2013, issued in corresponding Japanese Patent Application No. 2010-523312, filed Sep. 1, 2008. Total 8 pages, including English Translation.

* cited by examiner

MULTIPLE ACTUATING-FORCE SHEARING MACHINE

CROSS REFERENCE TO RELATED APPLICATION

The present application is a 35 U.S.C. §§371 national phase conversion of PCT/EP2008/007124, filed 1 Sep. 2008, which claims priority of European Application No. 07253538, filed 7 Sep. 2007, the disclosure of which is incorporated by reference herein. The PCT International Application was published in the English language.

FIELD OF INVENTION

The invention relates to the general field of shearing and in particular to the shearing of metal plates and strips.

BACKGROUND OF THE INVENTION

To perform a cut with a hydraulic shearing machine at least one shear blade has to be moved in the direction toward another shear blade with a force which is named overall actuating-force, that overall actuating-force being sufficient to overcome the resistance of the material to be cut, that resistance being named cutting force. When shearing wide metal plates and strips, a straight cut of the full width of material would require an enormous overall actuating-force which would not be practical. Consequently, shearing machines for shearing wide material generally use either a raked shear blade, or a curved shear blade for a rocking type shearing action.

A raked shear blade type shearing is illustrated in simplified cross section in FIG. 1. The upper raked shear blade 1 moves down relative to the lower straight shear blade 2 in order to cut the material 3. The overall actuating-force necessary is much reduced compared to a straight cut of the full width of the material because the width of the material which is being cut 4 at any particular point during the whole cutting cycle is much smaller than the full width of the material 3.

A rocking type shearing action is illustrated in simplified cross section in FIG. 2. The curved upper shear blade 5 rocks in such a way that it approximates a rolling type movement where the lowest point of the curved upper shear blade stays at approximately the same vertical height whilst moving horizontally across the material 6 which is being cut. The width of the material which is being cut 7 at any particular point during the whole cutting cycle is much smaller than the full width of the material which is being cut 6. During shearing, the lower straight shear blade 8 does not move.

GB 2405118 A describes a hydraulically actuated shearing machine which achieves a rocking type shearing action by using a curved shear blade and two separately controlled hydraulic cylinders. A simplified cross section is illustrated in FIG. 3. The piece of material that is to be cut 9 is positioned between an upper curved shear blade 10 and a lower straight shear blade 11. The upper curved shear blade 10 is attached to an upper support beam 12 and the lower straight shear blade 11 is attached to a lower support beam 13. Two hydraulic cylinders 14 and 15 of a hydraulic actuating-mechanism are connected between the upper support beam 12 and the lower support beam 13. Each of the hydraulic cylinders 14 and 15 engages the upper support beam 12 in one engaging-area, hydraulic cylinder 14 in the engaging area on the left end of upper support beam 12, and hydraulic cylinder 15 in the engaging area on the right end of upper support beam 12. By controlling the stroke of hydraulic cylinders 14 and 15 separately but in a synchronized manner the upper shear blade 10 can be made to execute a rocking type shearing action. The same type of shearing machine could be used with raked shear blades instead of curved shear blades in which case the two hydraulic cylinders move synchronized in the same direction to achieve the cutting action.

A consequence of using a raked shear blade or a rocking type shearing action is that the distance which the shear blade has to move to complete the cut is much greater than for a straight full width cut with a straight shear blade. For such a straight cut the shear blade only has to move through at most the full thickness of the material which is being cut. With a raked shear blade the distance the shear blade has to move is the thickness of the material plus the width of the material multiplied by the tangent of the rake angle. Typically the rake angle is only about 2 degrees and consequently for wide material the shear blade movement required is many times greater than for a straight cut. Similarly for a rocking type shearing action as illustrated in FIG. 3 the movement of the hydraulic cylinders 14 and 15 is many times greater than would be required for a straight full width cut.

The actuating-force of a hydraulic cylinder 14 or 15 which is operated with the cylinder rod in tension is the product of its annulus area multiplied by the available supply pressure of the hydraulic fluid. In a shearing machine according to FIG. 3 the combined annulus area of the hydraulic cylinders 14 and 15 must be sufficient to generate the required overall actuating-force for the thickest and strongest material that is to be cut with the available supply pressure of the hydraulic fluid.

In a practical shearing line for metal plates and strips it is important that the throughput of the shearing machine can keep pace with the other production units which deliver the material to be cut and process the cut material. Throughput is the mass of material processed per time unit, i.e. output per time unit. The throughput of a shearing machine depends on a number of factors including the width and thickness and strength of the material being cut, the number of cuts required, the time it takes to perform the complete cut, which is called the cutting cycle time, and the time it takes to reset the shear blades which are moved for shearing to their starting position and to move the piece of material between cut positions, which is called the reset-time.

The strength of a material is defined by parameters such as yield strength and elongation to fracture.

As a result of these factors a hydraulically operated shearing machine like the one in FIG. 3 has three primary parameters which determine the necessary size of the hydraulic fluid pump system and of the valves which supply fluid to the hydraulic cylinders. The first parameter is that the combined annulus area of the hydraulic cylinders must be sufficient to generate the overall actuating-force required for the strongest and thickest material that is to be cut. The second parameter is that the stroke of the hydraulic cylinders must be sufficient to cut the widest and thickest material. The third parameter is that for all kinds of materials to be cut the shearing machine must be able to provide cutting cycle times and reset-times which allow fulfilling the throughput demands. The sum of cutting cycle time and reset-time must permit the hydraulic shearing machine to perform the number of cuts per time unit necessary for the desired throughput. For example, to achieve sufficient throughput a shearing machine for metal plates typically must be able to work with a cutting cycle time of about 3 seconds and a reset-time of about 7 seconds.

For thin and/or narrow material per ton of output more cuts are required than for thick or wide material, and consequently the same throughput requires more cuts per time unit than for thick and/or wide material. Therefore, the hydraulic system of pumps, valves and cylinders of a shearing machine like the one in FIG. 3 has to be dimensioned such that it can provide the short cutting cycle time and reset-time required for the thinnest and/or narrowest material to be cut.

Hence for cutting materials with a wide range of width, thickness and strength with a certain throughput in a hydraulic shearing machine like the one in FIG. 3, the hydraulic cylinders must have a large annulus area and a large stroke and are required to move with the short cutting cycle time and reset-time which is needed for the thinnest or narrowest material. Hydraulic cylinders with large stroke and large annulus area have a large volume. Consequently, the volume of hydraulic fluid to be pumped for moving the shear blades is large and has to be pumped quickly, which requires large hydraulic pumps and valves. A hydraulic system with large pumps and valves is very expensive and needs a lot of space, and the operation of large pumps and valves is energy-intensive and high-maintenance.

FR2212771 describes a hydraulic shearing machine with a raked blade in which two hydraulic cylinders with common stem engage the support beam of a raked blade. Both hydraulic cylinders are hydraulically connected. When during cutting the pressure in the firstly used cylinder rises above a threshold value a valve in delivery line for hydraulic fluid to the cylinders opens and the second cylinder begins to operate in addition to the firstly used cylinder. If the pressure in the firstly used cylinder does not rise above the threshold value, that valve does not open, consequently the second cylinder is not supplied with hydraulic fluid under pressure and only the firstly used cylinder is in operation. For fast resetting the blade after cutting only one of the hydraulic cylinders is filled with hydraulic fluid under pressure. Hence, FR2212771 provides a method of operating a hydraulic shearing machine with a raked blade with variable actuating forces, and offers the possibility to quicken the resetting movement by using only one of several hydraulic cylinders present. However, for a hydraulic shearing machine with a curved blade the teaching of FR2212771 is not applicable, because to achieve a correct rocking type shearing action with a curved blade it is required that the movement of the two ends of the curved blade is controlled and synchronized precisely. If the system described in FR2212771 was used on each end of a curved blade, the movements could not be properly synchronized because for a given hydraulic flow the speed of the downward movement of the blade in FR2212771 depends on whether or not the pressure in the firstly used cylinder exceeds the threshold.

OBJECT OF THE INVENTION

The object of the present invention is to provide a method of operating a hydraulic shearing machine with curved blade able to cut materials with a wide range of thickness, width and strength with sufficient throughputs, in which the required size of hydraulic pumps and valves is reduced, and to provide a hydraulic shearing machine for performing that method with a reduced size of the hydraulic pump and valves compared to the prior art.

DESCRIPTION OF THE INVENTION

That object is solved by a method for operating a hydraulic shearing machine comprising for cutting a shearing-movement of at least one shear blade starting from a starting-position under application of an overall actuating-force, and for resetting of the at least one shear blade which was moved for cutting to its starting-position after accomplishment of the shearing-movement a reset-movement under application of an overall reset-force, the shearing-movement and the reset-movement being accomplished by a hydraulic actuating-mechanism comprising hydraulic cylinders, and the overall actuating-force and the overall reset-force being applied to the at least one shear blade which is moved for cutting by at least two hydraulic cylinders of the actuating-mechanism, the magnitude of the overall actuating-force being adjustable by switching one or several hydraulic cylinders (21,22,23,24) of the actuating-mechanism in and out of operation-mode, characterized in that the cutting is a rocking type shearing action with a rolling-type movement, and in that the positions of the at least one shear blade (17) which is moved are controlled by a control system (32) by regulating the flow of hydraulic fluid to the hydraulic cylinders (21,22, 23,24) according to setpoints for a shear blade position versus time function and the overall actuating-force and overall reset-force requirements, Cutting of material is accomplished by the shearing-movement of at least one shear blade. By the time the shearing movement starts, each shear blade to be moved is in its respective starting-position. From this starting-position the shear blade is moved under application of an overall actuating-force. When the material is cut completely the shearing movement stops. Then the shear blade is reset to its starting position by application of an overall reset-force. The shearing-movement and the reset-movement are accomplished by a hydraulic actuating-mechanism which comprises hydraulic cylinders. The overall actuating-force and the overall reset-force are applied by at least two of these hydraulic cylinders. When a hydraulic cylinder applies an actuating-force or reset-force it is in operation-mode. When a hydraulic cylinder is out of operation-mode it does not apply an actuating-force or a reset-force. The overall actuating-force is the sum of the actuating-forces of all hydraulic cylinders in operation-mode during cutting. The overall reset force is the sum of the reset forces of all hydraulic cylinders in operation-mode during resetting.

The magnitude of the overall actuating-force can be adjusted. Adjustment is done by switching one or several cylinders of the actuating-mechanism in or out of operation-mode. Depending on the overall actuating-force necessary for cutting the material the number and/or the area-type of hydraulic cylinders which are switched in operation-mode is chosen. The effective area of a hydraulic cylinder is the area through which the actuating-force or the reset-force is provided. Depending on the operation-mode of a hydraulic cylinder, its effective area varies. For example, in single rod type hydraulic cylinder which is operated with the cylinder rod in tension like in FIG. 3 the effective area is the annulus area. If a single rod type hydraulic cylinder is operated with the cylinder rod in compression like in FIG. 6, the effective area is the piston area. For a through rod type hydraulic cylinder such as illustrated in FIG. 5 the effective areas in an operation-mode with the cylinder rod in compression and in an operation-mode with the cylinder rod in tension are annulus areas. Hydraulic cylinders with equal effective area are of the same area-type. Hydraulic cylinders with different effective areas are of different area-types. If the supply pressure of the hydraulic fluid is the same for all hydraulic cylinders of the actuating-mechanism, hydraulic cylinders of different area-types provide different forces. Hence for the provision of a certain actuating-force a cylinder of adequate area-type can be chosen.

Compared to the prior art according to FIG. 3, the inventive adjustability of the overall actuating-force, which is done according to the material to be cut, has the advantage that the size of the hydraulic pump system and valves of the shear machine can be considerably reduced.

When a thick and/or wide and/or strong material is to be cut with a certain throughput, a high overall actuating-force and therefore a large sum of effective cylinder areas is required, but the cutting cycle time may be rather long since only a small number of cuts have to be done per time unit. The large volume of hydraulic fluid necessary to fill the large cylinder volume has to be pumped during the long cutting cycle time. Such an operation-mode is a low speed-high force-operation-mode. Compared to that, for cutting of a thin and/or narrow and/or soft material with the same throughput a smaller overall actuating-force and therefore a smaller cylinder area suffices when the same supply pressure of hydraulic fluid is used, but a shorter cutting cycle time and reset-time is necessary since more cuts have to be done per time unit. The small volume of hydraulic fluid necessary to fill the small cylinder volume has to be pumped during the short cutting cycle time. Such an operation-mode is a high speed-low force-operation-mode.

In the prior art only one cylinder area and accordingly only one overall actuating-force, which must be the highest overall actuating-force required, is available. Since the hydraulic pump system and valves have to be dimensioned such that they can provide the shortest necessary cutting cycle time, that means that pump and valves have to provide for a high speed-high force-operation-mode in which a large volume of hydraulic fluid has to be pumped in a short time. Accordingly, the hydraulic pumps and the valves of the hydraulic systems have to be large enough to fulfill that requirement. Contrary to the prior art, according to the present invention it is not necessary to provide for such a high speed-high force-operation-mode requiring large hydraulic pumps and valves. Since in the present invention it can be switched between low speed-high force-operation-mode and high speed-low force-operation-mode, provisions for a high speed-high force-operation-mode are not necessary. Hence it is sufficient to dimension hydraulic pump system and valves considerably smaller than in the prior art. The same hydraulic pump system and valves which are dimensioned such that they can process a small volume in the short time of the high speed-low force-operation-mode are able to process the large volume in the long time of the low speed-high force-operation-mode, because in both operation-modes the volume pumped per time unit is the same.

The cutting is a rocking type shearing action, which means that the shearing-movement is a rolling-type movement as described earlier in the description of FIG. 2.

The positions of the at least one shear blade which is moved are controlled by a control system according to setpoints for a shear blade position versus time-function. Control is done by regulating the flow of hydraulic fluid to the hydraulic cylinders according to these setpoints and the overall actuating-force and overall reset-force requirements.

Cutting cycle time and reset-time can be controlled by providing setpoints according to a shear blade position versus time-function. For definition of that function information about the required throughput, and about the characteristics of the material to be cut, such as width and thickness, can be used. A control system for controlling the position and movements of shear blades uses these setpoints together with information about required overall actuating-force and overall reset-force for regulating the flow of hydraulic fluid to the hydraulic cylinders of the actuating system. Longer cutting cycle times and/or reset-times are achieved by increasing the time period of the shear blade position versus time function, shorter cutting cycle and/or reset-times are achieved by reducing the time period.

Preferably, before cutting starts the overall actuating-force requirements for the material to be cut and the overall reset-force requirements are defined, and it is derived therefrom which hydraulic cylinders are to be switched in operation-mode to raise that overall actuating-force and that overall reset-force, and the shear blade position versus time-function is set according to which hydraulic cylinders are to be switched in operation mode, and the such defined overall actuating-force and overall reset-force requirements, the such derived information about which hydraulic cylinders are to be switched in operation-mode, and the accordingly set shear blade position versus time-function is supplied to the control system.

The overall actuating-force requirements for the material to be cut depend from the characteristics of the material such as width and thickness. While the required overall actuating-force varies depending on the material to be cut, the overall reset-force remains constant as long as the weight of the movable shear blade and of the support beam which carries the blade does not change, since the reset force must be large enough to move the blade and the support beam to the starting-position.

Therefrom it is derived which hydraulic cylinders are to be switched in operation-mode to raise that overall actuating-force and overall reset-force. According to which hydraulic cylinders are to be switched in operation mode the shear blade position versus time-function is set. That function defines the position of the shear blade during cutting and resetting and thereby defines cutting cycle time and reset-time. Longer cutting cycle times and/or reset-times are achieved by increasing the time period of the shear blade position versus time function, shorter cutting cycle and/or reset-times are achieved by reducing the time period. As outlined before, large force requires large cylinder volume to be filled but also allows long cutting cycle- and reset-times, small force requires small cylinder volume to be filled but also allows short cutting cycle- and reset-times.

The control system for controlling the position and movements of shear blades uses the appropriately set shear blade versus time function together with information about required overall actuating-force and overall reset-force for regulating the flow of hydraulic fluid to the hydraulic cylinders of the actuating system. By knowing the required overall actuating-force and overall reset-force the control system can automatically decide which hydraulic cylinders are to be switched in operation-mode to raise that overall actuating-force and overall reset-force—however, in a variant of the present invention that decision can also be done by the operator of the control system. Knowing that and having the appropriate shear blade position versus time-function setpoints enables the control system to supply hydraulic fluid sufficiently quick to the hydraulic cylinders to fulfill the requirements of the shear blade position versus time function.

As outlined before, the cutting cycle- and reset-times depend on the throughput demands the shearing machine has to fulfill. The throughput demands and the depending cutting cycle- and reset-times should also be supplied to the control system before cutting starts.

Preferably, in cases where more than two hydraulic cylinders were switched in operation-mode for the shearing-movement, after accomplishment of the shearing-movement at least one of these hydraulic cylinders is switched out of operation and the overall reset-force is raised without that hydraulic cylinder. Thereby, since less hydraulic cylinder volume has to be filled for resetting the shear blade to its starting position, the volume of hydraulic fluid which has to be pumped for the reset-movement and accordingly the reset-time is reduced.

In case that the actuating-mechanism comprises hydraulic cylinders of different area-types, it is especially preferred that the overall reset-force is raised by one of the hydraulic cylinders with the smallest effective area.

Thereby, the volume of hydraulic fluid which has to be pumped for the reset-movement and accordingly the reset-time is minimized.

The present invention further provides in FIG. 4 a hydraulic shearing machine for performing the method described above, comprising a pair of opposed shear blades (17,18) each of which is carried by a corresponding support beam (19,20), at least one of the shear blades (17) being movable by an hydraulic actuating-mechanism which engages with that shear blade's support beam (19), the hydraulic actuating-mechanism comprising hydraulic cylinders (21,22,23,24) which can be switched in and out of operation-mode, characterized in that the at least one shear blade (17) which is movable is a curved shear blade, and that the hydraulic actuating-mechanism engages with the support beam (19) of the at least one shear blade which is movable in two engaging-areas, and that in at least one engaging-area it engages the support beam with at least two hydraulic cylinders, and in that in each engaging-area with at least two hydraulic cylinders at least one hydraulic cylinder can be switched in and out of operation-mode independently of the operation-mode-status of at least one other hydraulic cylinder in that engaging-area, and in that the hydraulic shearing machine comprises a control system (32) for controlling the position of the at least one movable shear blade (17)

The at least one movable shear blade is a curved shear blade, such enabling cutting by a rocking type shearing action where the shearing-movement is a rolling type movement of the shear blade.

The hydraulic cylinders can be switched in and out of operation-mode. In operation-mode a hydraulic cylinder applies an actuating-force or a reset-force to the support beam and the shear blade respectively. Out of operation-mode a hydraulic cylinder does not apply an actuating-force or a reset-force to the support beam and the shear blade respectively.

Thereby it is possible to adjust the overall actuating-force and the overall reset-force applied to the support beam. The more hydraulic cylinders are switched into operation-mode, the higher the force applied; the more hydraulic cylinders are switched out of operation-mode, the smaller the force applied.

If only one independently switchable hydraulic cylinder is present, actuating-force and reset-force may be provided either by the independently switchable hydraulic cylinder alone, or by all hydraulic cylinders of the hydraulic actuating-mechanism together, or by all hydraulic cylinders but the independently switchable hydraulic cylinder. If more than one independently switchable hydraulic cylinder are present, actuating-force and reset-force may be also be provided by any combination of independently switchable hydraulic cylinders.

The hydraulic actuating-mechanism engages with the movable shear blade's support beam in two engaging-areas, and in at least one engaging-area it engages the support beam with at least two hydraulic cylinders, and in each engaging-area with at least two hydraulic cylinders, at least one hydraulic cylinder can be switched in and out of operation-mode independently of the operation-mode-status of at least one other hydraulic cylinder in that engaging-area.

Preferably, there are two hydraulic cylinders in both engaging-areas.

Preferably, the at least one hydraulic cylinder that can be switched in and out of operation independently of the operation-mode-status of at least one other hydraulic cylinder in that engaging-area can be switched in and out of operation-mode independently of the operation-mode-status of any other hydraulic cylinder of the hydraulic actuating-mechanism. Thereby freedom to choose an operation-mode-status for a hydraulic cylinder is maximized.

Each of the engaging-areas extends from one end of the support beam to the middle of the support beam.

In shearing machines for rocking type shearing action with a curved shear blade the hydraulic cylinders of the hydraulic actuating-mechanism have to engage in two engaging areas to allow a controlled downward movement of one end of the curved shear blade while the other end of the curved shear blade is moved upwardly controlled.

In the engaging-areas with at least two hydraulic cylinders engaging there can be two, three, four, five, six, preferably up to ten, or more hydraulic cylinders.

The control system for controlling the position of the at least one movable shear blade controls by regulating the flow of hydraulic fluid to the hydraulic cylinders (21,22,23,24) according to setpoints for a shear blade position versus time function and the overall actuating-force and overall reset-force requirements. A preferred embodiment of the invention is characterized in that the hydraulic actuating-mechanism engages with the movable shear blade's support beam with at least one telescopic hydraulic cylinder which comprises at least two hydraulic cylinders, at least one of which can be switched in and out of operation-mode independently of the operation-mode-status of at least one other hydraulic cylinder in the telescopic hydraulic cylinder.

Preferably, the at least one hydraulic cylinder that can be switched in and out of operation independently also can be switched in and out of operation-mode independently of the operation-mode-status of any other hydraulic cylinder of the hydraulic actuating-mechanism.

The use of telescopic hydraulic cylinders allows more compact and space saving design of the shearing machine.

According to one embodiment of the invention at least two of the hydraulic cylinders have different effective areas. Compared to an embodiment with hydraulic cylinders of equal effective areas, it is thereby possible to provide a smaller minimum force with the smaller cylinder while still providing the largest necessary force with the larger cylinder.

The hydraulic cylinders may be for example single rod type cylinders with the rod in either compression or tension during the cutting, or through rod type cylinders with equal or unequal areas and with the active rod in either compression or tension during the cutting, or telescopically nested cylinders in which a smaller cylinder fits within a larger cylinder. FIG. 7 illustrates telescopic cylinders 40, 41, 42 and 43, according to an aspect of the disclosure.

The hydraulic cylinders which are not in operation-mode can either follow the shearing-movement and/or the reset-movement of the support beam to which they are connected or engaged or they can be disconnected from the movement altogether, for example by holding the cylinder at a position where it does not engage with the support beam.

If the hydraulic cylinders which are not switched in operation-mode follow the movement of the shearing-movement and the reset-movement of the support beam to which they are engaged, then hydraulic fluid which is not under working pressure flows in and out of these cylinders. That flow may be allowed to pass from one side of the hydraulic cylinder's piston to the other by provision of a bypass valve. In single rod type cylinders the effective areas of the full bore side and of the rod side of the piston are different. Therefore, even when a bypass valve is provided, it is necessary to compensate for volume change during movement by provision of a header tank or a separate low pressure fluid supply.

In through rod type cylinders where the effective areas of both rod sides are the same, a bypass valve may be sufficient to allow flow to pass from one side of the cylinder to the other. However, to compensate for any leakage, even with a through rod type cylinder with bypass valve it may be necessary to have a connection to a small header tank or to a low pressure fluid supply when the cylinder is in the out of operation-mode.

Preferably, at least the hydraulic cylinders which can be switched in and out of operation-mode independently are through rod-type-cylinders in which the areas on both sides of the piston are the same.

According to a preferred embodiment, for each hydraulic cylinder that can be switched in and out of operation-mode independently the hydraulic actuating-mechanism comprises a bypass valve which can be operated to allow fluid to pass directly from one side of that hydraulic cylinder's piston to its other side when the hydraulic cylinder is moved while being switched out of operation-mode.

According to another embodiment of the invention, the hydraulic actuating-mechanism comprises a separate fluid supply, preferably a header tank or a low pressure fluid supply, which is connected to each of the hydraulic cylinders that can be switched in and out of operation-mode independently by at least one valve each.

According to another embodiment of the invention each hydraulic cylinder that can be switched in and out of operation-mode independently is switched in and out of operation-mode by isolation valves comprised in the hydraulic actuating-mechanism.

Preferably, the hydraulic actuating-mechanism comprises a pump system, and/or accumulators, and control valves which are sized such which the minimum cutting cycle time and/or reset-time which the shearing machine is required to provide is obtainable only when at least one hydraulic cylinder is switched out of operation mode.

BRIEF DESCRIPTION OF THE DRAWINGS

Schematic representations of the prior art and of exemplary embodiments of the invention are described in schematic FIGS. 1 to 6.

DESCRIPTION OF PREFERRED EMBODIMENTS

Figure 1:
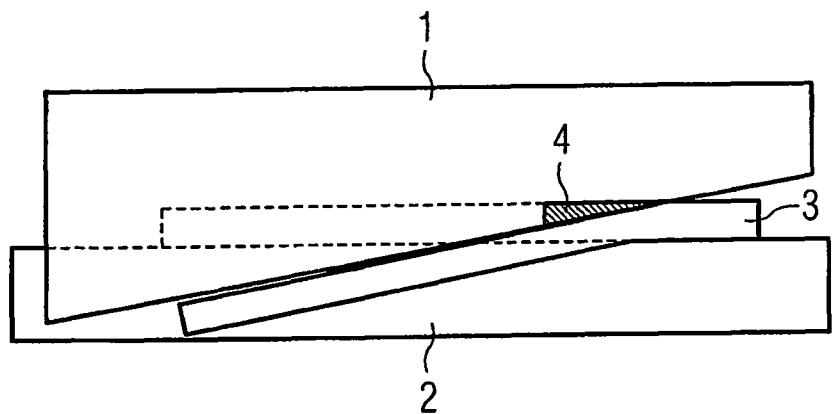
FIG. 1 shows a simplified cross section of a raked shear blade during shearing.
Figure 2:
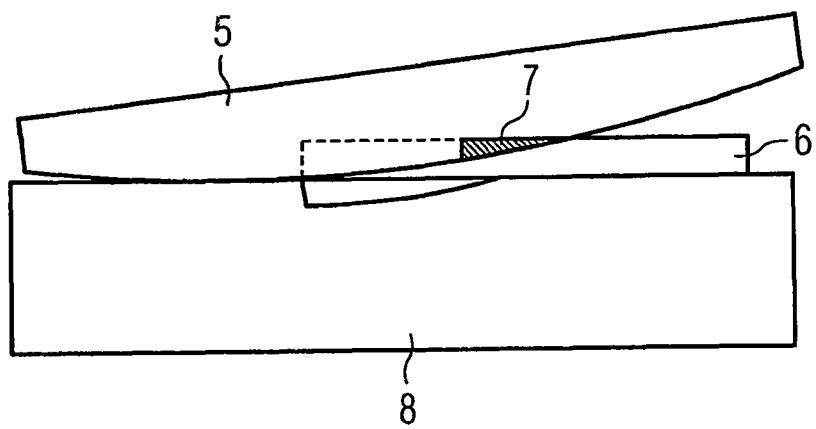
FIG. 2 shows a simplified cross section of a curved shear blade during rocking type shearing.
Figure 3:
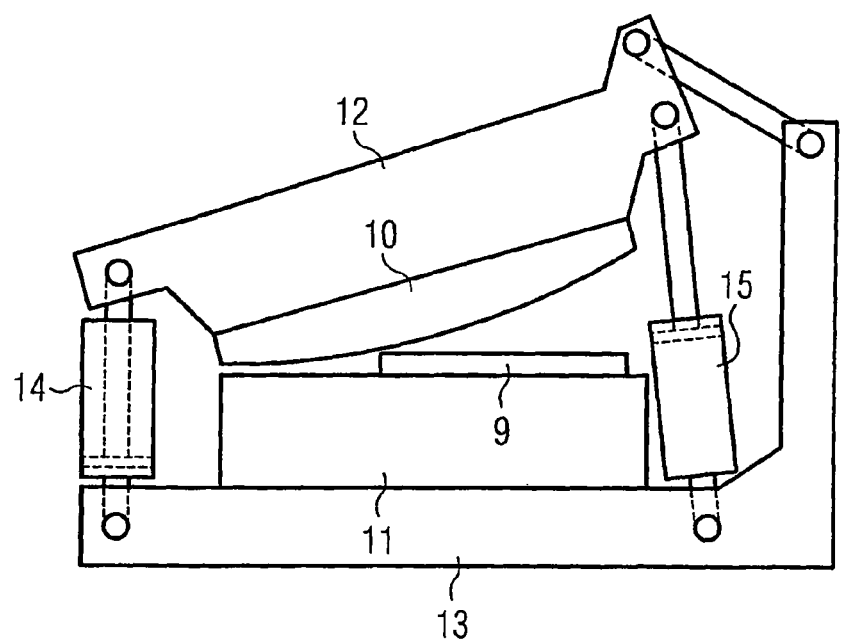
FIG. 3 shows a simplified cross section of a prior art hydraulic shearing machine with curved shear blade.
Figure 4:
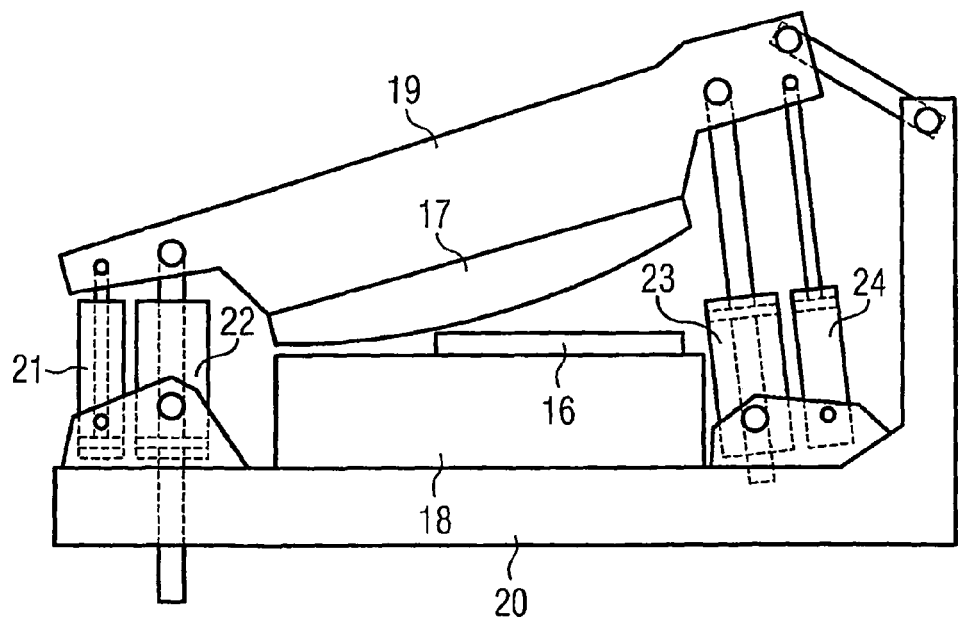
FIG. 4 shows a simplified cross section of an exemplary embodiment of an inventive hydraulic shearing machine with a curved shear blade for operation with the cylinder rods in tension.

In FIG. 4 a piece of material that is to be cut 16 is positioned between an upper curved shear blade 17 and a lower straight shear blade 18. The upper curved shear blade 17 is attached to an upper support beam 19 and the lower straight shear blade 18 is attached to a lower support beam 20. Instead of having one hydraulic cylinder in each engaging area as shown in FIG. 3, the inventive shearing machine has two hydraulic cylinders 21 and 22 in the engaging-area in the left half of the support beam, and two hydraulic cylinders 23 and 24 in the engaging area in the right half of the support beam.

The effective areas of the hydraulic cylinders 21 and 24 are smaller than the effective areas of the hydraulic cylinders 22 and 23. The combined effective areas of all hydraulic cylinders is sufficient to generate the overall actuating-force required for the thickest and strongest material that is to be cut. The effective area of the smaller hydraulic cylinders 21 and 24 is chosen such that it is sufficient to generate the overall actuating-force required for cutting products which require the fastest cutting speed and consequently the shortest cutting cycle time.

Figure 5:
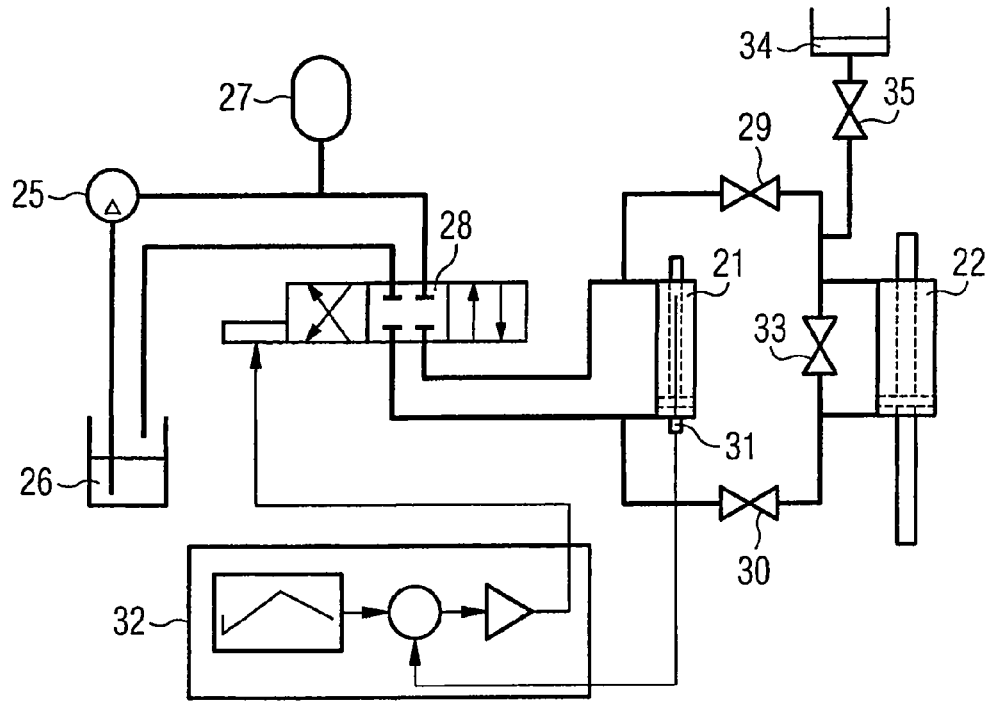
FIG. 5 shows a schematic illustration of the hydraulic system and control system of the inventive shearing machine of FIG. 4.

In FIG. 5 the hydraulic pump 25 pumps hydraulic fluid from the hydraulic fluid tank 26. A set of accumulators 27 comprising one or several accumulators stores the high pressure hydraulic fluid delivered by the hydraulic pump 25 and smoothes out the variations in pressure during the operation of the shearing machine. A servo-valve 28 controls the flow of fluid to the hydraulic cylinders 21 and 22. A practical system may require more than one servo-valve to provide the required flow rates but the principle is the same as for the single servo-valve illustrated. Operation of the servo-valve 28 in one direction allows hydraulic fluid to pass from the high pressure supply line into one side of the hydraulic cylinder 21 whilst simultaneously allowing flow out of the other side of cylinder 21 to go to the tank 26. When the servo-valve 28 is operated in the opposite direction the flows go in the opposite direction. The isolation valves 29 and 30 allow hydraulic cylinder 22 to be either linked in to the high pressure supply line or to be disconnected from it. In the preferred embodiment the position of hydraulic cylinder 21 is measured by a transducer 31 and a control system 32 compares the measured position with a shear blade position versus time function. The control system 32 produces a signal which operates the servo-valve 28.

Hydraulic cylinder 22 is a through rod type cylinder in which the effective areas on both sides of the piston are equal. When cylinder 22 is not in operation-mode isolation valves 29 and 30 are closed. Then bypass valve 33 can be opened to allow flow to pass directly from one side of hydraulic cylinder 22 to the other. Since the areas on both sides are equal the volume of hydraulic fluid in the hydraulic cylinder is the remains constant throughout shearing and it is not mandatory to supply additional hydraulic fluid to hydraulic cylinder 22 or to dump excess hydraulic fluid to a tank. However, to compensate for any possible leakage when hydraulic cylinder 22 is not in operation a header tank 34 serving as separate hydraulic fluid supply, is connected to the hydraulic system by a valve 35. The hydraulic fluid provided by that separate hydraulic fluid supply does not need to be at high pressure and so a simple header tank 34 or a separate low pressure hydraulic fluid system can be used.

In the simplified illustrative FIG. 5 only one servo-valve 28, only one set of cylinders 21 and 22, and only one set of valves 29, 30 and 33 are shown but in a complete rocking action type shearing machine as illustrated in FIG. 4 there would obviously be another servo-valve and another set of isolation valves and a bypass valve for the hydraulic cylinders 23 and 24 in the engaging area on the other end of the support beam.

In a preferred method of operation of the present invention in a shearing machine according to FIG. 4 and FIG. 5 the small hydraulic cylinders 21 and 24 are always used for resetting the shear blade to the starting position. When thick and strong material is to be processed then the large hydraulic cylinders 22 and 23 are used for shearing together with the small hydraulic cylinders 21 and 24, but as soon as the cut is finished the valves 29, 30 and 33 are operated so that the reset-movement of the curved shear blade from the end of cut position to the starting position is done using only the small hydraulic cylinders 21 and 24. This minimizes the quantity of hydraulic fluid that has to be pumped for the reset-movement.

In the embodiment of FIGS. 4 and 5 the hydraulic pump 25, accumulators 27 and servo-valve 28 are sized such that the minimum cutting cycle time and/or reset-time for the required throughput can be achieved when the small hydraulic cylinders 21 and 24 are used. When cutting thick and strong material the isolation valves which isolate the large hydraulic cylinders 22 and 23 are opened and the bypass valves of the large hydraulic cylinders 22 and 23 are closed. Thereby, the large hydraulic cylinders 22 and 23 are switched in operation-mode. When they are in operation-mode the cutting cycle time is made longer approximately in proportion to the ratio of the sum of the effective areas of the large hydraulic cylinders 22 and 23 and of the small hydraulic cylinders 21 and 24 to the sum of the effective areas of the small hydraulic cylinders 21 and 24, so that the flow requirements remain within the capacity of the pump system and servo-valves. The cutting cycle time is made longer simply by increasing the time period of the reference position versus time function of the control system 32. The decision as to whether to use the high speed-low force-operation-mode or the low speed-high force-operation-mode can be made by the operator or preferably by the control system automatically according to the parameters of the material which is to be cut. The isolation valves and bypass valves are preferably operated electrically by the control system.

Whilst the exemplary embodiment shown in FIG. 4 has two hydraulic cylinders in both of the engaging areas located in each half of the curved shear blade's support beam, the principle of the invention also applies to embodiments having more than two cylinders in each engaging area provided that at least one of the cylinders can be switched into or out of operation-mode independently. It also applies to embodiments having one hydraulic cylinder in one engaging area and more than one hydraulic cylinder in the other engaging area. Whilst in the exemplary embodiment the two hydraulic cylinders in each engaging area have different effective areas, the principle of the invention also applies to embodiments having cylinders with equal effective areas. Whilst in the preferred embodiment the large hydraulic cylinders and the small hydraulic cylinders are both used when cutting thick and strong material the principle of the invention also applies to systems where only the large cylinders are used when cutting thick and strong material and only the small cylinders are used when shearing thinner or softer material.

Figure 6:
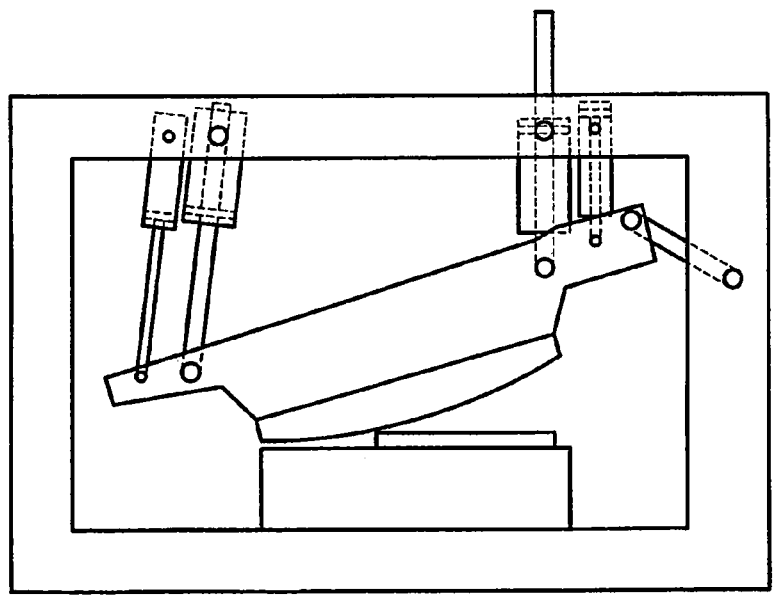
FIG. 6 shows a simplified cross section of an embodiment of an inventive shearing machine with curved shear blade for operation with the cylinder rods in compression.
Figure 7:
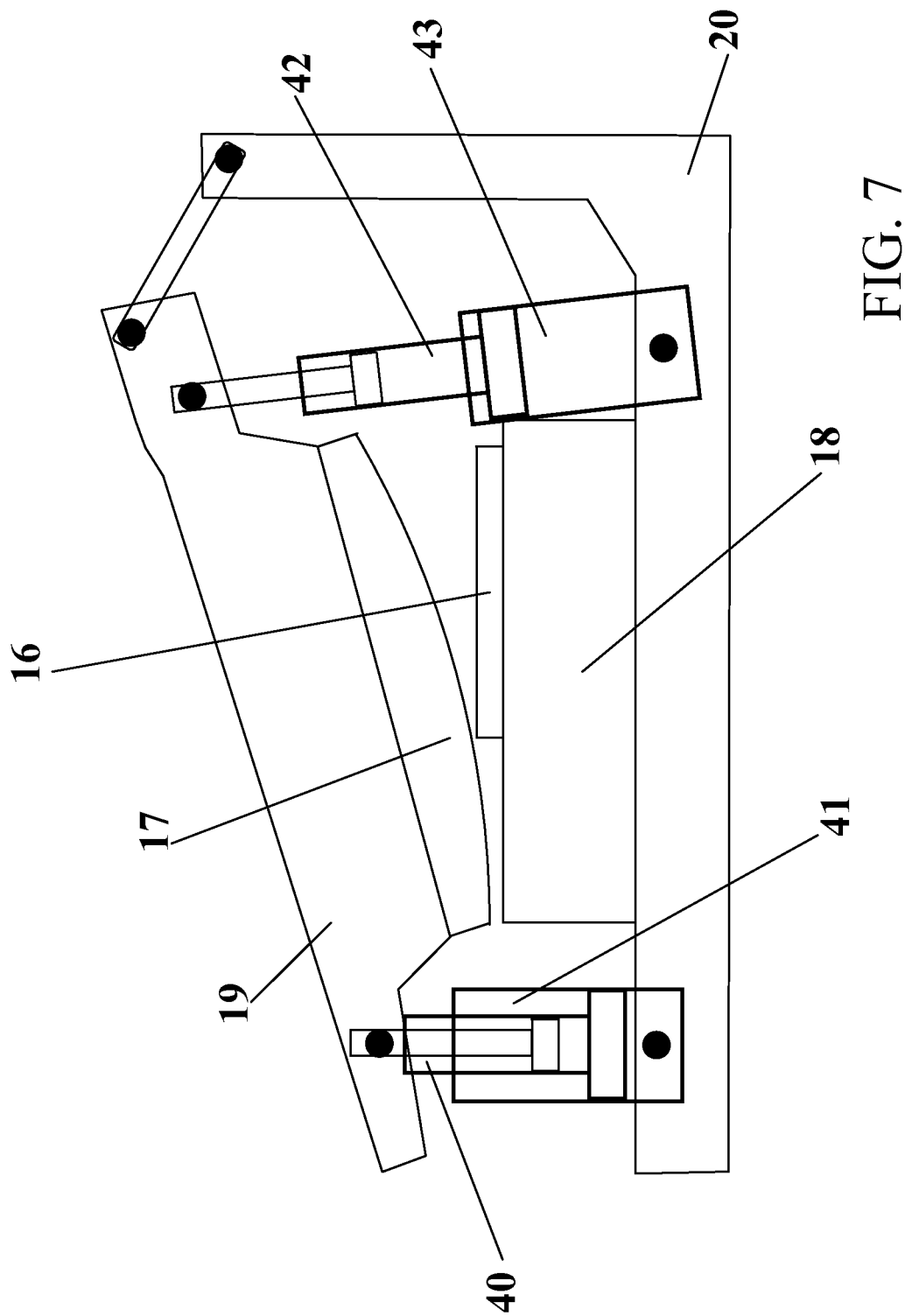
FIG. 7 is a schematic illustration of an example of an embodiment of the shearing machine showing telescopic cylinders.

In FIG. 4 the hydraulic cylinders are operated with the cylinder rods in tension but the principle of the invention also applies to shearing machines in which the hydraulic cylinders are operated with the cylinder rods in compression as illustrated in FIG. 6. Operation in tension is preferred.

The invention claimed is:

1. A method for operating a hydraulic shearing machine, wherein the machine includes at least one shear blade, a hydraulic actuating mechanism for operating the at least one shear blade, and a control system for the hydraulic actuating mechanism, the method comprising:
   cutting by shearing by performing a shearing-movement of the at least one shear blade, starting from a starting-position of the blade, under application of an overall actuating-force on the at least one blade;
   wherein the cutting is a rocking shearing action with a rolling movement; and subsequently,
   resetting the at least one shear blade, which blade had been moved for cutting, to the starting position of the blade after accomplishment of the shearing-movement of the blade, by causing a reset-movement of the at least one blade under application of an overall reset-force on the at least one shear blade;
   performing the shearing-movement and the reset-movement by operating the hydraulic actuating-mechanism which comprises a plurality of hydraulic cylinders, an overall actuating-force and the overall reset-force being applied to the at least one shear blade which is moved for cutting by at least two of the hydraulic cylinders of the actuating-mechanism;
   adjusting a magnitude of the overall actuating-force on the at least one shear blade by switching one or several of the hydraulic cylinders of the actuating-mechanism in and out of a respective operation-mode; and
   controlling the positions of the at least one shear blade by the control system regulating a flow of hydraulic fluid to the hydraulic cylinders according to setpoints for a shear blade position versus time function and to overall actuating-force and overall reset-force requirements.

2. The method according to claim 1, further comprising:
   before cutting, defining the overall actuating-force requirements for a material to be cut and the overall reset-force requirements, deriving therefrom which of the hydraulic cylinders are to be switched in operation-mode to raise that overall actuating-force and that overall reset-force, and setting the shear blade position versus time-function according to which hydraulic cylinders are to be switched in operation mode, and supplying the such defined overall actuating-force and overall reset-force requirements, the such derived information about which hydraulic cylinders are to be switched in operation-mode, and the accordingly set shear blade position versus time-function, to the control system.

3. The method according to claim 1, wherein when more than two of the hydraulic cylinders had been switched in operation-mode for the shearing-movement, after the shearing-movement of the at least one shear blade, at least one of the more than two hydraulic cylinders is switched out of operation-mode and the overall reset-force is raised without that hydraulic cylinder.

4. A hydraulic shearing machine comprising:
   a pair of opposed shear blades, at least one of the shear blades being movable with respect to the other shear blade, the at least one shear blade which is movable is a curved shear blade;
   an hydraulic actuating-mechanism which engages the at least one blade, the hydraulic actuating-mechanism comprising hydraulic cylinders, and each hydraulic cylinder being switchable in and out of operation-mode, wherein the hydraulic actuating-mechanism engages the at least one shear blade in two engaging-areas along the at least one blade in at least one engaging-area along the at least one blade, the hydraulic actuating mechanism engages the at least one blade with the at least two of the hydraulic cylinders, in each engaging-area of the at least one blade with at least two hydraulic cylinders, at least one of the at least two hydraulic cylinders is configured to be switched in and out of operation-mode independently of the operation-mode-status of at least one other of the at least two hydraulic cylinder in that engaging-area; and a control system configured and operable for controlling the position of the at least one movable shear blade.

5. The hydraulic shearing machine according to claim 4, further comprising:
the hydraulic actuating-mechanism engaging with the movable shear blade by at least one telescopic hydraulic cylinder which comprises the at least two hydraulic cylinders,
wherein at least one of the at least two cylinders is configured to be switched in and out of operation-mode independently of the operation-mode-status of at least one other hydraulic cylinder in the telescopic hydraulic cylinder.

6. The hydraulic shearing machine according to claim 5, wherein at least two of the hydraulic cylinders have effective areas different from one another.

7. The hydraulic shearing machine according to claim 4, wherein the two hydraulic cylinders are configured to be switchable in and out of operation-mode independently, and are through rod cylinders, each cylinder having a piston having two sides, an area of a first side of the two sides of the piston being equal to an area of a second side of the two sides of the piston.

8. The hydraulic shearing machine according to claim 7, wherein for each hydraulic cylinder that is switchable in and out of operation-mode independently, the hydraulic actuating-mechanism comprises:

a bypass valve which is configured and operable to allow fluid to pass directly from one side of that hydraulic cylinder's piston to any other side of the piston when the hydraulic cylinder is moved while being switched out of operation-mode.

9. The hydraulic shearing machine according to claim 4, wherein the hydraulic actuating-mechanism further comprises:
a separate fluid supply, and a respective valve connecting the fluid supply to each of the hydraulic cylinders that are switchable in and out of operation-mode independently.

10. The hydraulic shearing machine according to claim 4, wherein for each hydraulic cylinder that is switchable in and out of operation-mode independently, the hydraulic actuating-mechanism comprises isolation valves for switching in and switching out of operation-mode.

11. The hydraulic shearing machine according to claim 4, wherein the hydraulic actuating-mechanism comprises a pump system and/or accumulators, and control valves sized such that the minimum cutting cycle time and/or reset-time which the shearing machine is required to provide is obtainable when at least one hydraulic cylinder is switched out of operation mode.

12. The hydraulic shearing machine according to claim 4, wherein the hydraulic cylinders are arranged for operation in tension during cutting.

13. The hydraulic shearing machine according to claim 4, further comprising:
a respective support beam for each of the shear blades,
wherein the hydraulic cylinders are connected to the at least one blade by connection to the beams thereof at areas along the support beams.

14. The hydraulic shearing machine according to claim 4, wherein at least two of the hydraulic cylinders effective areas different from one another.

15. The hydraulic shearing machine according to claim 9, wherein the fluid supply comprises a header tank or a low pressure fluid supply.

* * * * *

UNITED STATES PATENT AND TRADEMARK OFFICE
CERTIFICATE OF CORRECTION

PATENT NO. : 8,505,426 B2  Page 1 of 1
APPLICATION NO. : 12/676941
DATED : August 13, 2013
INVENTOR(S) : Christoforou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 617 days.

Signed and Sealed this

Fifteenth Day of September, 2015

Michelle K. Lee
*Director of the United States Patent and Trademark Office*